(No Model.) 2 Sheets—Sheet 1.
M. M. CLOUGH.
CORN PLANTER AND MARKER.
No. 290,320. Patented Dec. 18, 1883.

Witnesses:
C. D. Miller,
H. A. Stoltenberg.

Inventor:
Milo M. Clough,
By Thomas G. Orwig, Attorney.

(No Model.) 2 Sheets—Sheet 2.

M. M. CLOUGH.
CORN PLANTER AND MARKER.

No. 290,320. Patented Dec. 18, 1883.

Witnesses:
C. D. Miller,
H. A. Stoltenberg.

Inventor:
Milo M. Clough,
By Thomas G. Orwig, Attorney.

UNITED STATES PATENT OFFICE.

MILO M. CLOUGH, OF CARLISLE, IOWA.

CORN PLANTER AND MARKER.

SPECIFICATION forming part of Letters Patent No. 290,320, dated December 18, 1883.

Application filed October 21, 1882. (No model.)

*To all whom it may concern:*

Be it known that I, MILO M. CLOUGH, of Carlisle, in the county of Warren and State of Iowa, have invented an Improved Corn-Planter, of which the following is a specification.

My invention relates to that class of seed-planters that operate automatically to drop seeds simultaneously in two parallel rows at regular intervals of time and space, and also at the same time will, while the machine is advancing, mark the ground as required to produce equidistant parallel rows, and also check-rows, without previous marking or setting of stakes.

It consists—

First. In the manner of forming a rigid carriage with wheels at its rear end and runners at its front, and combining therewith an adjustable caster-wheel to lift the runners as required in turning about and starting rows evenly. Heretofore an adjustable caster-wheel has been combined with the carriage of a planter for the purpose of elevating the runners; but my manner of forming a rigid carriage-frame by means of metal sections that serve as axle-bearers and joint-pieces for connecting the front and rear portions of the frame is novel and advantageous.

Second. In the manner of forming and applying markers to simultaneously make marks at right angles relative to each other.

Third. In the manner of making the heels of the runners adjustable relative to the carriage-frame, to regulate the depth of the furrows that receive the seed. Heretofore a seed-hopper and tubular drill-tooth have been adjustably connected for the purpose of regulating the depth of the planting; but my manner of combining and adjusting the heels of pivoted runners with the seed-boxes to regulate the depth of furrows is novel and advantageous.

Fourth. In combining a land-roller with the carriage to smooth the ground and to keep the runners in the soil at a uniform depth. Heretofore a roller has been combined with the standards of plows used as furrow-openers in a corn-planter; but my manner of combining a land-roller with the adjustable front end of a rigid carriage-frame supported upon pivoted runners is novel and advantageous, all as hereinafter fully set forth.

Figure 1:
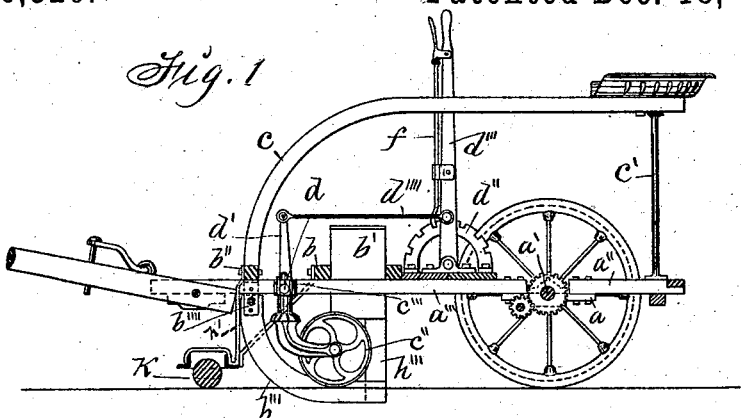
Figure 2:
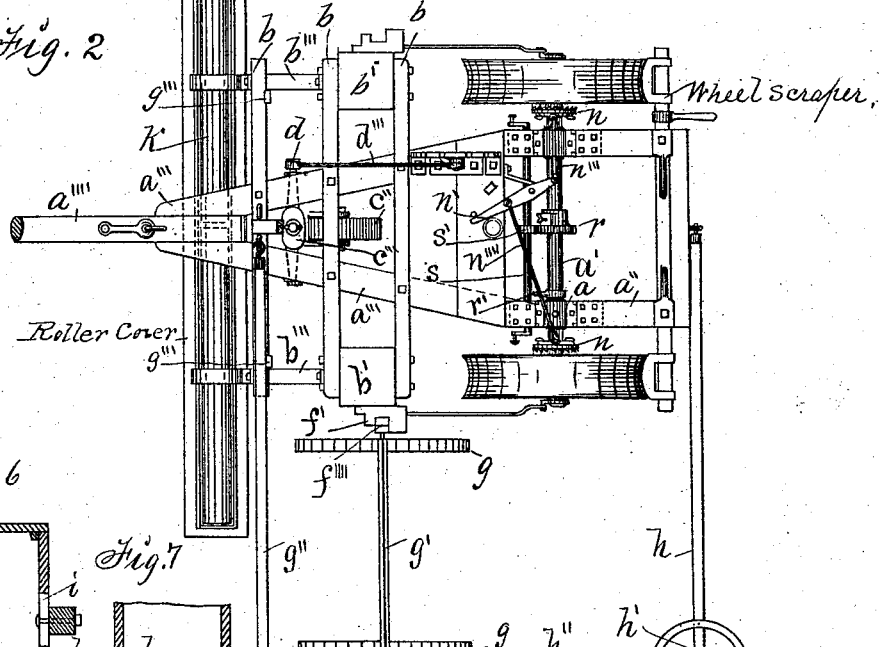
Figure 3:
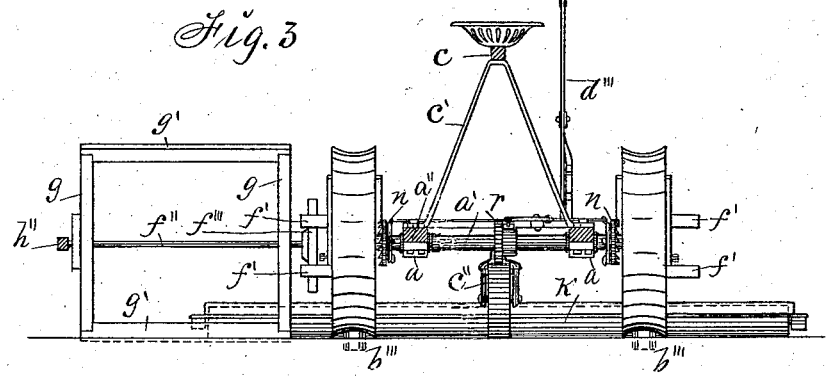
Figure 4:
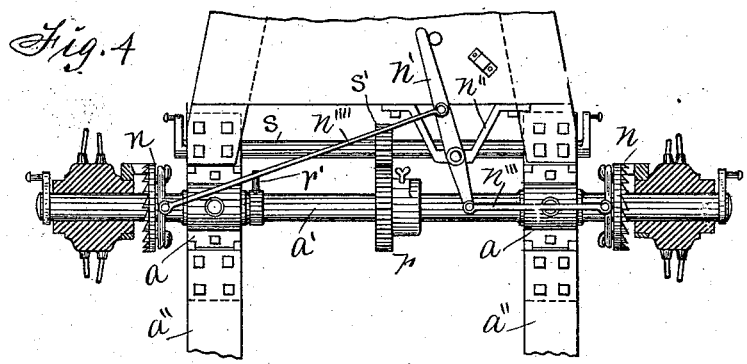
Figure 5:
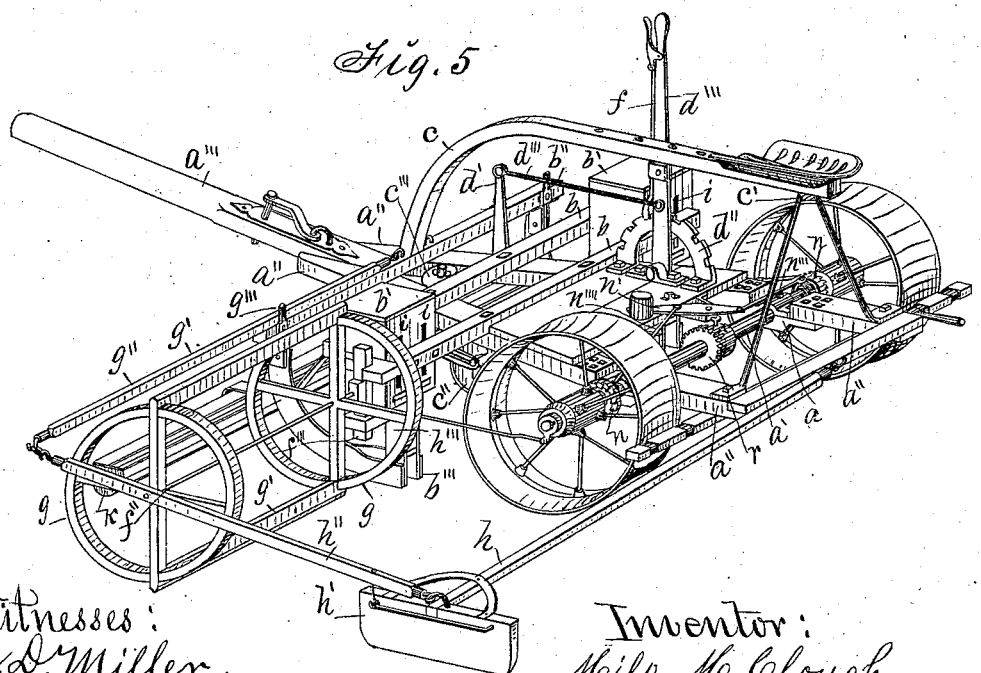

Figure 1 of the accompanying drawings is a side view of my machine. Fig. 2 is a top view. Fig. 3 is a rear view. Fig. 4 is an enlarged sectional top view. Fig. 5 is a perspective view of the complete machine. Figs. 6, 7, 8, and 9 are enlarged detail views of the seed-dropping mechanism.

Jointly considered, these figures clearly illustrate the construction and operation of my complete invention.

$a\ a$ are metal axle-bearings, in which is a revolving carriage-axle, $a'$, that has carriage-wheels placed loosely on its ends.

$a''$ are the side bars of a rectangular frame, bolted on the top of the rear ends of the bearings $a$.

$a'''$ are tongue-hounds bolted to the front ends of the bearings $a$.

$a''''$ is a tongue pivoted to the converging front ends of the hounds $a'''$.

$b\ b$ are cross-pieces fixed to the hounds $a'''$, to extend laterally in parallel position to support the seed-boxes $b'$.

$b''$ is a third cross-piece fixed to the hounds in advance of the others, to support the front ends of the runners $b'''$, that are pivoted thereto by means of angle-irons $b''''$, that are bolted to the cross-piece, as clearly shown in Fig. 1.

$c$ is a bent bar fixed to the center of the front cross-piece, $b''$, to extend upward and rearward, to support a seat at its rear end.

$c'$ are braces that extend from the seat or rear end of the bar $c$ to the side bars, $a''$, of the frame below.

$c''$ is a caster-wheel pivoted in the center and hub $c'''$ of a rack-shaft, $d$, that extends to the under side of the hounds, and is connected therewith by means of suitable bearings fixed to the hounds $a'''$.

$d'$ is an arm that extends upward from the end of the shaft $d$.

$d''$ is a segmental rack fixed on the top of one of the hounds.

$d'''$ is a lever pivoted to the center of the rack.

$d''''$ is a rod connecting the lever with the arm $d'$ of the rack-shaft $d$.

$f$ is a pawl carried by the lever $d'''$, to engage the rack. By pulling the lever $d'''$ backward the caster-wheel is moved forward and downward to elevate the runners and the front end of the carriage, as required in turning about at the end of the field.

$f'$ (clearly shown in Fig. 3) are bearings fixed to the outside faces of the seed-boxes $b'$, to support the axles $f''$ of revolving and detachable check-row markers.

$f'''$ are cross-heads on the ends of the axles, to extend through the bearings $f'$ in such a manner that the axles and complete revolving markers will rise and fall as they pass over obstructions.

$g\ g$ are wheels that are equal in diameter with each other and with the carriage and drive wheels, and, rigidly connected by two parallel bars, $g'$, extend beyond the peripheries of the wheels to penetrate the ground and make a mark at every half-revolution of the wheels.

$g''$ is a rigid bar flexibly connected with the center of the front part of the carriage-frame in such a manner that it can be readily reversed from one side to the other.

$g'''$ (shown in Fig. 5) are stops fixed to the carriage-frame to restrict the bars from moving backward relative to the carriage.

$h$ is a rigid bar flexibly and reversibly connected with the rear and center of the carriage-frame.

$h'$ is a marker in the form of a runner, fixed to the end of the reversible bar $h$.

$h''$ is a rigid bar flexibly and detachably connected with the bar $h$ and the front part of the runner $h'$ and the free end of the reversible bar $g''$, to connect the two markers, and to form a support and bearing for the end of the axle $f''$, that extends through the revolving marker.

Figure 6:
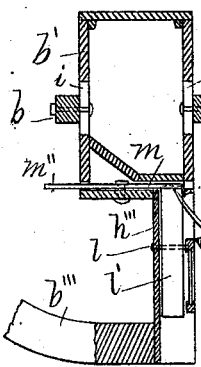

$h'''$ are tubular posts rigidly fixed to the heels of the pivoted runners and the bottoms of the seed-boxes, as clearly shown in Fig. 6.

$i\ i$ are vertical slots in the front and rear walls of the seed-boxes, through which bolts are passed to adjustably connect the combined seed-boxes and runners with the cross-piece $b$ of the carriage-frame, as required to raise and lower the heels of the runners to regulate the depth of the planting of the seeds.

$i'$ are openings in the posts $h'''$ to facilitate cleaning the valves.

$k$ is a land-roller, preferably formed in sections, to conform to uneven ground, suspended from the cross-piece $b''$ and front part of the rigid carriage-frame by means of bearers $k'$, fixed to said cross-piece in such a manner that the bottom of the roller will be about two inches above the bottom of the runners when the bottoms of the runners are in a horizontal position, as required to make the ground level in advance of the planting and marking, and to retain the runners at a uniform depth in the soil from one end of a row and field to the other.

Figure 7:
Figure 8:
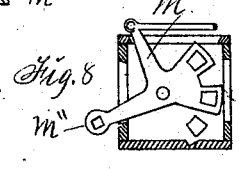
Figure 9:
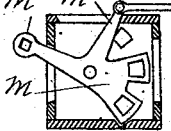

$l\ l$ are bolts passed through the posts $h'''$, to pivot the vibrating valves. These valves $l'$ are formed by uniting two leaf-springs at their centers in such a manner as to produce a transverse opening through which to pass a pivot, and to allow the ends of the springs to stand apart in their normal condition, as shown in Fig. 7. The top ends of each valve extend into a recess in the center of a horizontally-vibrating seed-valve located under the perforated bottom of the seed-box. As this valve moves laterally relative to the spring-valve placed at right angles thereto in the post $h'''$, it compresses the distended top ends and pushes them against the wall of the post at the top to admit seeds from the seed-cup, and presses one of the lower spring ends against the opposite wall of the same tubular post, to form a pocket that will retain the seeds until a reverse motion of the valve occurs, when the seeds will drop into the furrow at the heel of the runner.

$m$ (clearly shown in Figs. 8 and 9) is the valve pivoted under the bottom of the seed-box.

$m'$ is an arm extending laterally therefrom, and connected with a crank on the end of the revolving carriage-axle by means of a pitman-rod. As the axle revolves, the valve $m$ is vibrated and imparts a reciprocating motion to the top end of the valve $l'$, as required to co-operate the two valves and double drop mechanism, to plant seeds at regular intervals of time and space every time the carriage and drive wheels make a half-revolution.

$m''$ is an arm extending forward from the valve $m$. By connecting the arms $m''$ of the two valves they can be readily operated by hand by means of a lever pivoted to the carriage-frame.

$n\ n$ are sliding clutches on the axle $a'$, designed to engage the loose wheels and to lock them to the axle, as required, to rotate the axle.

$n'$ is a compound lever, pivoted to a cross-bar on the carriage-frame by means of a fulcrum, $n''$, fixed to the same frame.

$n'''$ is a rod flexibly connected with the short arm of the lever $n'$ and one of the sliding clutches.

$n''''$ is a rod connected with the lever at a point between the fulcrum and the end of its long arm and the slide-clutch on the opposite end of the axle. By thus connecting the clutches they can be readily moved simultaneously in opposite directions by one motion of the lever, to lock or unlock the wheels from the axle.

$r$ is a detachable gear-wheel fixed to the central portion of the shaft $a'$.

$r'$ is an index-finger fixed to the same shaft, to show when the axle has completed a revolution. It is designed to extend the finger forward simultaneously with the motions of the valves that let the seeds drop into the ground, and when the index-finger and valves do not thus coact I simply reach down from the seat and turn the axle by means of the wheel $r$, and adjust it relative to the positions of the vibrating valves and lower or second drop mechanism.

$s$ is an auxiliary axle that has cranks on its ends, mounted in front of and parallel with the axle $a'$. It has a detachable pinion, $s'$, fixed thereto to engage the gear-wheel $r$. By reversing the positions of the two seed-boxes the arms $m'$ of the valves $m$ will extend inward, so that they can be readily connected with the cranks on the ends of the shaft $s$ and operated to plant seeds more rapidly and closer together in the rows or continuously, as required in drill-rows.

To regulate the motion and spaces between plants, I simply change the size of the pinion that engages the gear-wheel.

From the foregoing detailed description of the construction and function of each element and sub-combination of my invention, their unitary actions and the practical operation of the complete machine will be readily understood by persons familiar with corn-planting mechanism.

I claim as my invention—

1. The rigid and adjustable carriage-frame for corn-planters, composed of the metal axle-bearings $a$, the revolving axle $a'$, having loose wheels on its ends, the frame fixed to the rear of the axle-bearings, the tongue-hounds $a'''$, and the cross-pieces $b\ b\ b''$, in combination with the pivoted and adjustable caster-wheel $c''$, substantially as shown and described, for the purposes specified.

2. The revolving and self-adjusting marker, composed of the detachable axle $f''$, having a cross-head, $f''''$, the ends or wheels $g$, and the bars $g'$, in combination with the fixed bearings $f'$, substantially as shown and described.

3. The seed-boxes $b$, having slots $i$ in their walls, the posts $h$, and runners pivoted to the carriage-frame at their front ends, arranged and combined substantially as shown and described, for the purposes specified.

4. A rigid carriage-frame having the front ends of runners pivoted to its front end, carriage-wheels at its sides and rear end, and a land-roller at its front in advance of the runners, substantially as and for the purposes specified.

MILO M. CLOUGH.

Witnesses:
 THOMAS G. ORWIG, .
 C. D. MILLER.